Sept. 22, 1964     T. S. KINNEY     3,150,251
PACKAGED TANK HEATER WITH PIVOTED CONTROL ASSEMBLY
Filed March 9, 1962     2 Sheets-Sheet 1
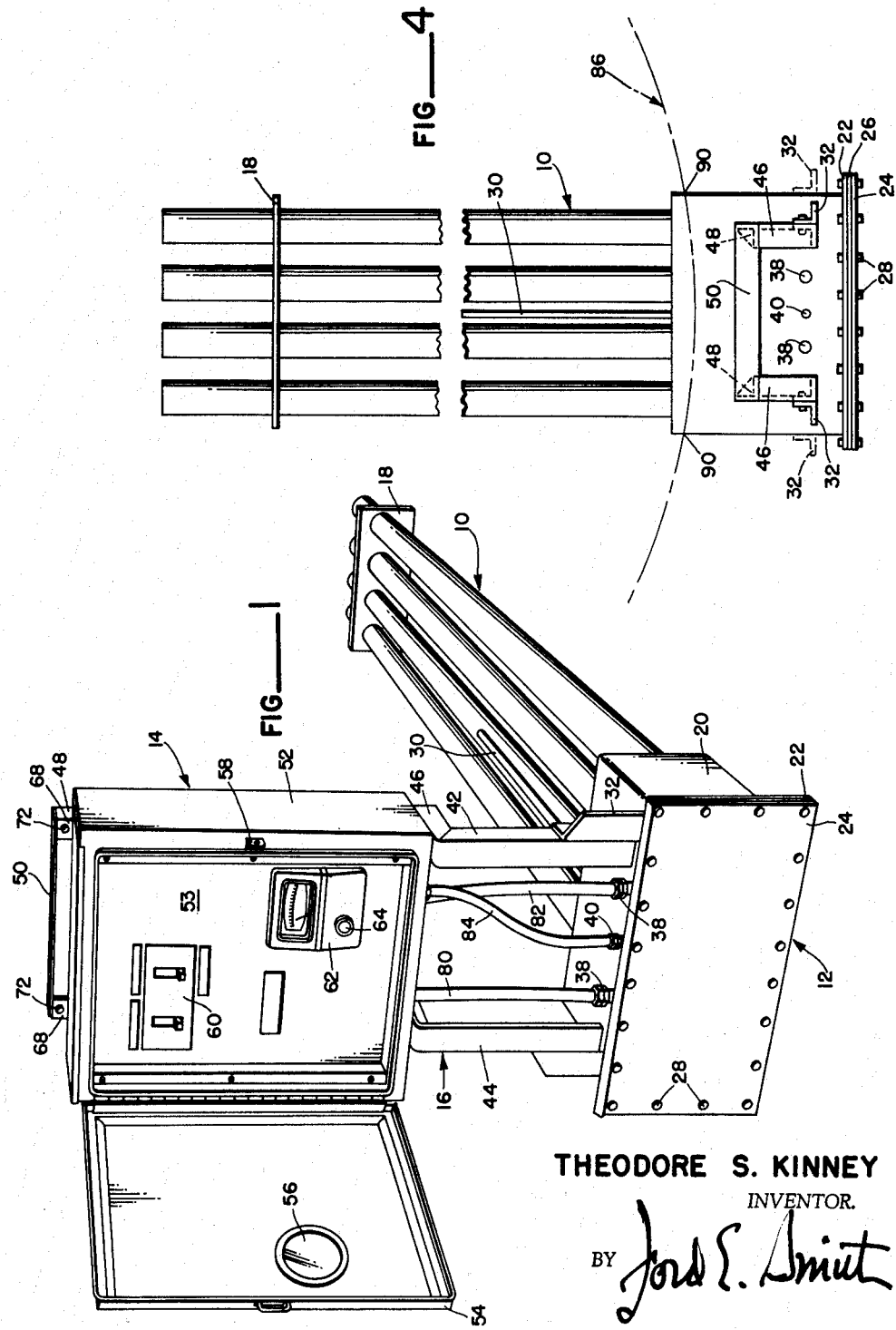
THEODORE S. KINNEY
INVENTOR.
BY

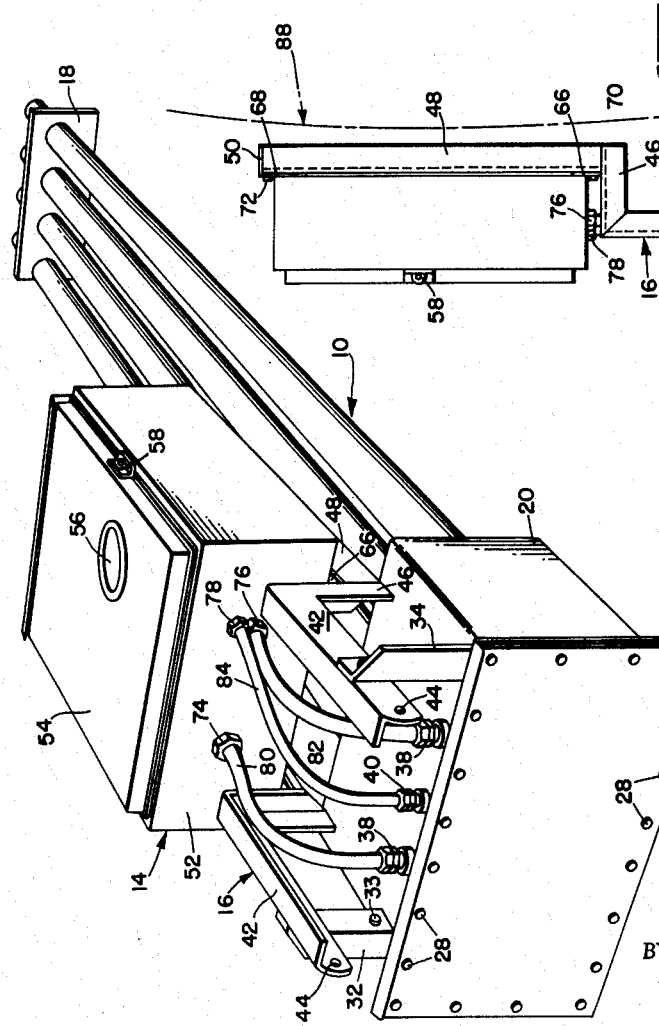

United States Patent Office 3,150,251
Patented Sept. 22, 1964

3,150,251
PACKAGED TANK HEATER WITH PIVOTED
CONTROL ASSEMBLY
Theodore S. Kinney, 2733 4th Ave. S., Seattle, Wash.
Filed Mar. 9, 1962, Ser. No. 178,598
3 Claims. (Cl. 219—523)

This invention relates to a new and useful concept for pivotally attaching the control portion of a storage tank heater so that the entire heater may be shipped completely assembled. More particularly this invention relates to a completed storage tank immersion heater in which the control panel housing and its supporting framework may be attached to and folded down to rest on the main portion of the heater package.

A long recognized problem in the storage tank heater industry has been the lack of a complete or prefinished tank heater. This problem has been particularly acute in commercial and industrial applications where the heating units are large, bulky and heavy. Up to the present time the tank heaters have been shipped in a knocked down state in which the control portion is shipped independently of the heating portion. In some instances the control panel is not even wired. Thus, when the various portions of a tank heater are brought to a job site the control panel housing has to be wired, and the leads therefrom connected to the heater terminal box. Such jobsite assemblage and wiring entails time and expense. Very often the control panel box is incorrectly wired with the result that the buyer finds himself spending additional money to correct the mistakes.

This invention alleviates the above problems by providing a completely wired control panel and housing which is supplied to the buyer already wired and attached to the heater terminal box and heating units. The buyer is only required to pivot the control frame and housing to an upright position, secured the control frame in said position with two bolts and connect the power input lines to the control panel housing.

Accordingly, it is a prime purpose of this invention to provide a completely wired and assembled heavy industrial storage tank immersion heater and control housing.

Yet another object of this invention is to provide a storage tank heater which has a control housing and frame pivotally attached to the heater allowing the entire tank heater to be shipped in a folded down condition.

Still another object of this invention is to furnish a storage tank heater with a pivotal fold down control housing and frame assembly which eliminates all wiring operations except to connect power input lines to the control housing.

A further object of this invention is to supply a storage tank heater which is so designed so that the flexible metallic conduit between the control housing and the terminal box is not stretched or stressed when the control box and frame is in the folded down position.

A still further object of this invention is to provide a storage tank heater which, because the pivotal control housing frame supports the control housing in spaced relation to the terminal box, prevents heat from said terminal box from passing into said control housing to damage the wiring and control components.

An even further object of this invention is to supply a storage tank heater which because of the design of the support frame allows the control housing to be pivoted forwardly from its upright position.

These, together with other objects and advantages which will become subsequently apparent, reside in the details of construction and operation as more fully hereinafter described and claimed, reference being had to the accompanying drawings, forming a part hereof, wherein like numerals refer to like parts throughout, and in which:

FIGURE 1 is a perspective view of a complete heater with the control housing and frame in the upright position;

FIGURE 2 is a perspective view of a complete heater with the control housing and frame in the folded down position;

FIGURE 3 is an elevational side view showing the control housing and frame in the upright position and how it would appear in a folded down position; and FIGURE 4 is a top plan view of the heater with the control housing removed showing further details of the control frame.

Referring now to FIG. 1 it will be seen that the storage tank heater of this invention comprises in general a series or group of tubular heating units 10 attached to a terminal box 12. A control housing 14 is supported on frame 16 which is pivotally connected to terminal box 12.

Terminal box 12 is a rectangular box affair 20 made of heavy plate metal having a flange 22 around the outside or open end. A cover plate 24 is attached to flange 22 by a series of bolts and nuts 28. A gasket 26 is disposed between the flange and cover plate to facilitate sealing the inside of the terminal box. Removing the cover plate obviously allows access to the heating elements and terminals, the details of which are not pertinent to this invention.

Rigidly connected to the back of box 20 are the tubular heating units 10 into which are inserted the heating elements mentioned above. Heating units 10 are made of metal. While 3 inches represents an average diameter for heating units 10, the particular job for which a tank heater is designed may require tubes of smaller size and conceivably of much larger dimensions. There may be any number of tubes or units 10 and the tubes are of various sizes from 12 to 45 feet in length, though, again, it must be realized that units 10 may be even shorter and conceivably much greater in length than the maximum and minimum just mentioned. A spacing plate 18 is provided with holes into which the units 10 are inserted. More than one spacing plate may be provided since it is desirable that there be no unsupported span of more than 10 feet in length. The tubes are not joined to the spacing plate so as to allow for movement due to heat expansion. Said plates 18 will normally be placed about 12 inches from the end of the heating units.

The upper surface of terminal box 12 is provided with two upstanding support brackets 32. Brackets 32, as may be seen most clearly in FIG. 4, are spaced about 2 inches to the rear of flange 22 and near the outside edges of box 20. Said brackets 32 are approximately 7 inches in length, constructed of 2 inch angle iron and provided with holes for pivot bolt 34 and locking bolt 36 (see FIG. 3). Obviously the dimensions recited are considered to be nonlimiting since it is quite possible that modifications in design will entail dimension changes. As may be seen the brackets 32 are not confined to the position shown but may be secured, preferably by welding, to any position on box 20 depending on the size of the particular control frame and box. The dash-dot lines in FIG. 4 indicate that said brackets 32 may be placed on the side walls of box 20.

It will also be seen that protruding from the rear of and rigidly attached to terminal box 20 is the thermostat well 30. Said well 30 is approximately 36 inches long, ½ inch pipe which houses the thermostat bulb and part of the capillary tube running to the control housing.

The top of box 20 is provided with openings for conduit connectors 38 and for thermostat capillary conduit connector 40. It is to be noted that the openings for the connectors 38, 40 are substantially in line with the upstanding brackets 32 for reasons which will be made clear hereinafter.

The brackets 32, as mentioned above, extend about 7 inches above the upper surface of box 20. A hole is provided near the upper end of said bracket for receiving pivot bolt 34. A lower hole 33 is provided about 4 inches below the pivot connection for accommodating locking bolt 36. Hole 33 then is about 2 inches above box 20.

The control housing supporting frame, generally designated by number 16, is a substantially upstanding rectangular frame with a forwardly facing offset ledge portion for receiving the control housing 14. Two generally vertical or upstanding legs 42 made of 2 inch angle iron are pivotally connected to brackets 32. In terms of dimensions said upstanding legs 42 are perhaps twice as long as brackets 32. The ledge is formed by attaching to the upper end of each leg 42 a generally horizontal ledge piece or member 46 which is about half the length of said leg 42. Ledge piece 46 is joined to leg 42 so as to extend rearwardly or in the direction of the heating units 10.

The upper portion of frame 16 is comprised of two generally vertical or upstanding frame members 48. Each frame member 48, being about twice the length of leg 42, is made of 2 inch angle iron secured preferably by welding to the top surface of the rear end of ledge piece 46. The upper ends of members 48 are connected by strap or bar 50 to complete the frame.

The lower or free end of legs 42 is mounted on brackets 32 so that it is spaced about an inch above the upper surface of box 20. It will be seen that in addition to the hole provided for pivot bolt 34 there is lower locking hole 44 which is positioned to be aligned with locking hole 33 in bracket 32 when the frame is in its upright position.

As mentioned above, the brackets 32 may be moved outwardly or inwardly according to the size of the frame involved. The frame size may vary because the heaters vary in capacity and size. It is not inconceivable that a third frame unit could be added if the bulk of the heater demanded. Though the frame is preferably made of 2 inch angle metal, other structural shapes could certainly be employed.

The control assembly, generally shown as number 14, is comprised principally of housing 52, a rectangular, box-like affair having a depth of about 8 inches. Housing 52 has control panel 53 (see FIG. 1) inside thereof and cover door 54. Panel 53 is provided with circuit breakers 60, control meter 62 and control knob 64. Small, circular window 56 obviously permits reading of the meter when cover door 54 is closed. Meter 62, as those skilled in the art will understand, permits the operator to set this storage tank heater at the temperature desired and also informs the operator whether the desired temperature is being maintained.

Securely located on the rear or back of housing 52 are upper and lower mounting brackets 68 and 66, respectively. Said mounting brackets are positioned on housing 52 in alignment with frame members 48 and extend upwardly and downwardly beyond the bottom and top of said housing. Holes are provided so that mounting bolts 70 and 72 will hold the housing to the frame.

The bottom of housing 52 is provided with openings to receive power conduit connectors 74 and 76 and thermostat capillary conduit connector 78. Extending between connector 74 and connector 38 on box 20 is power conduit 80. In the same way power conduit 82 extends between connectors 76 and 38 and thermostat capillary conduit 84 extends between connectors 78 and 40. It will be noted that the control housing connectors 74 and 76 are located midway between the front and back edges of the bottom surface. The conduits are connected so that when the control assembly is in its upright position there is no slack in said conduits. The power conduits 80–82 will usually be ¾ inch in size while the thermostat capillary conduit 84 is usually ½ inch size.

In designing this storage tank heater to overcome the problems mentioned above it was necessary to give much attention to dimensions. It was desired to have the frame 16 resting on the back portion of box 20 when in its folded-down position as shown in FIG. 2 and in dash-dot lines in FIG. 3. At the same time it was desirable not to increase the length of the conduits extending between the control housing and terminal box. Thus it was found that when the conduits were connected generally in line between brackets 32 and centrally of the housing bottom that pivoting the frame down did not stretch or distort the flexible metallic conduit or pull it loose from a connector. Thus a minimum amount of conduit would have to be used. With the pivot point or axis located about 6 inches above the box 20 a clean bend was effected in the conduit. The flexible metallic conduit which protects the thermostat capillary and the wiring extending between terminal box and control housing may be of type known as "Sealtite" manufactured by the Metal Hose Division of Anaconda American Brass Company.

It will be appreciated that the completely assembled storage tank heater is shipped in the condition shown in FIGS. 2 and 3. Installing the heater merely involves cutting a hole in the tank wall to the dimensions of box 20. The heater is inserted so that approximately the two rear inches of box 20 are within the tank. FIG. 3 shows in dotted lines how the heater might appear with relation to a horizontal storage tank having a slightly dished end 88. Similarly, dotted lines 86 indicate how a heater might appear with relation to a more conventional vertical circular wall type tank. Dotted line 92 indicates that this invention may be installed in flat vertical walls as well. In any case, the heater is inserted and fixed in position by running a welding bead 90 around the box 20. Thus the tank is also resealed. Obviously, the spacing plate 18 rests on the tank bottom or some other supporting means within the tank so as to eliminate stresses on the connection between heating units 10 and terminal box 20.

It will be apparent that if, for instance, insulation or paint were to be applied to the tank that the control frame and housing could also be pivoted forward without requiring that any of the wiring be disconnected. When the heater is installed and the control frame secured in upright position the input power lines to the control housing and panel are connected and the storage tank heater is ready to operate. The heaters are supplied in a variety of sizes, depending on the amount of heat desired, the size of the tank involved and the nature of the material to be heated. A heater having three 27 foot tubes will weigh approximately 800 pounds. However, it will be understood that the weight of a particular heater could be considerably less and substantially greater.

The foregoing is considered as illustrative only of the principle of this invention. Since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed is:

1. A storage tank heater, comprising: a terminal box; a plurality of tubular-shaped heating units connected to the back of said terminal box; generally upstanding support bracket means attached to the top and near the front of said terminal box; a control frame having generally upstanding leg means, generally upstanding support member means, and generally horizontal ledge means connecting said leg means and said support member means, said leg means being pivotally connected to said bracket means to allow said frame to be held in a generally upright position and to allow said frame to be pivoted downwardly to rest on said terminal box; a control housing having a control panel for said tubular-shaped heating units, said housing being detachably secured to said control frame; and conduit means extending between said terminal box and said control housing.

2. A storage tank heater having a pivoted control assembly, comprising; a terminal box; a plurality of tubular-shaped heating units connected to the back of said terminal box; a pair of generally upstanding support brackets attached in spaced-apart relationship to the top and near the front of said terminal box; a control frame having a pair of generally upstanding and spaced-apart legs, a pair of generally upstanding and spaced-apart support members, and a pair of generally horizontal and spaced-apart ledge members connecting said legs and said support members to form a forwardly-facing ledge, said legs being pivotally connected to said brackets to allow said frame to be held in a generally upright position and to allow said frame to be pivoted downwardly to rest on said terminal box; a control housing having a control panel for said tubular-shaped heating units, said housing being detachably secured to said control frame; and conduit means extending between said terminal box and said control housing.

3. A storage tank heater, comprising: a terminal box; a plurality of generally tubular-shaped heating units connected to the rear of said terminal box; a pair of generally upstanding support bracket means attached in spaced apart relationship to the top and near the front of said terminal box; a control frame means having a pair of spaced apart interconnected frame members, with one each of said frame members being pivotally attached to one of said upstanding bracket means to allow said control frame means to be held in a generally upright position and to be allowed to be pivoted downwardly to rest on said terminal box, each of said spaced apart frame members having an upwardly facing generally horizontal offset section on the forward side above the lower end thereof to form a generally horizontal ledge means on said control frame means; a control housing having a control panel for said tubular-shaped heating units, said housing being detachably secured to said control frame means over said ledge means; and electrical conduit means extending between said terminal box and said control housing.

References Cited in the file of this patent
UNITED STATES PATENTS

| | | |
|---|---|---|
| 2,453,832 | Dadson | Nov. 16, 1948 |
| 2,471,260 | Chapman | May 24, 1949 |
| 2,554,083 | Berg | May 22, 1951 |
| 2,556,554 | Pellegrin | June 12, 1951 |
| 2,811,628 | Gottfried | Oct. 29, 1957 |
| 2,902,582 | Pappas | Sept. 1, 1959 |